(12) United States Patent
Kumura

(10) Patent No.: US 7,269,236 B2
(45) Date of Patent: Sep. 11, 2007

(54) FREQUENCY OFFSET ESTIMATOR

(75) Inventor: Takahiro Kumura, Tokyo (JP)

(73) Assignee: NEC Corporation (JP)

( * ) Notice: Subject to any disclaimer, the term of this patent is extended or adjusted under 35 U.S.C. 154(b) by 833 days.

(21) Appl. No.: 10/332,538

(22) PCT Filed: Aug. 22, 2001

(86) PCT No.: PCT/JP01/07177

§ 371 (c)(1), (2), (4) Date: Jan. 10, 2003

(87) PCT Pub. No.: WO02/19645

PCT Pub. Date: Mar. 7, 2002

(65) Prior Publication Data

US 2003/0147456 A1    Aug. 7, 2003

(30) Foreign Application Priority Data

Aug. 29, 2000 (JP) .............................. 2000-259029

(51) Int. Cl.
*H04L 27/06* (2006.01)
*H04B 1/707* (2006.01)

(52) U.S. Cl. ...................................... 375/344; 375/147

(58) Field of Classification Search ................ 375/344, 375/316, 130, 136, 131, 140, 147
See application file for complete search history.

(56) References Cited

U.S. PATENT DOCUMENTS 6,353,642 B1 *  3/2002  Asahara et al. ............. 375/344

(Continued)

FOREIGN PATENT DOCUMENTS

JP          04-35113          12/1992

(Continued)

OTHER PUBLICATIONS

"A Method of High Precision Frequency Detection with FFT" by Makoto Tabei, et. al., May 1987, vol. J 70-A No. 5 pp. 798-805.
"Performance of AFC Scheme Based on Half-Symbol Differential Detection" by Kazuo Tanada, et. al., Technical Report of IEICE, Jun. 1996, pp. 1-6.

(Continued)

*Primary Examiner*—Kevin Burd
(74) *Attorney, Agent, or Firm*—Dickstein, Shapiro, LLP.

(57) ABSTRACT

A complex symbol sequence (13), which is a product of an orthogonally detected complex demodulated symbol sequence (1) and a conjugate complex number of a known symbol sequence (2), is applied to phase rotating units (4a, 4b, 4c) which change the phase of the complex symbol sequence (13) based on frequency offsets (fa, fb, fc). N-symbol adders (5a, 5b, 5c) each add N symbol values supplied from the phase rotating units (4a, 4b, 4c), while M-power adders (6a, 6b, 6c) each calculate the power of a value supplied from the N-symbol adders (5a, 5b, 5c), and add the power M times. A frequency offset control unit (7) controls frequency offsets applied to the phase rotating units (4a, 4b, 4c) based on three power sums supplied from the M-power adders (6a, 6b, 6c), and delivers a power offset estimate (8).

8 Claims, 6 Drawing Sheets

U.S. PATENT DOCUMENTS 6,522,696 B1 * 2/2003 Mobin et al. ............... 375/262

FOREIGN PATENT DOCUMENTS

| | | |
|---|---|---|
| JP | 05-508989 | 12/1993 |
| JP | 8-213933 | 8/1996 |
| JP | 9-8765 | 1/1997 |
| JP | 9-200081 | 7/1997 |
| JP | 2705613 | 10/1997 |

OTHER PUBLICATIONS

"Frequency Offset Estimation Schemes Under Wide-Spread Time-Dispersive Channels" by Shuichi Hayashi, et. al., Technical Report of IEICE, Sep. 9, 1998, pp. 13-18.

3rd Generation Partnership Project(3GPP™), 3rd Generation Partnership Project; Technical Specification Group Radio Acess Network; Physical channels and mapping of transport channels onto physical channels (FDD), 1999, Valbonne, France, http://www.3gpp.org.

* cited by examiner

PRIOR ART

FREQUENCY OFFSET ESTIMATOR

TECHNICAL FIELD

The present invention relates to a frequency offset estimator for use in a receiver which demodulates a signal modulated in accordance with an orthogonal modulation scheme.

BACKGROUND ART

The quasi-synchronous detection typically used as a detection method in landline mobile communications requires that a transmission carrier frequency matches a reference carrier frequency for quasi-synchronous detection of a receiver. However, when oscillators in a transmitter and a receiver are not sufficiently high in frequency stability and accuracy, this results in a difference in frequency between both sides. This is called a "frequency offset." Since the frequency offset, if any, causes the phase of a detected signal to rotate, the signal cannot be correctly demodulated. To prevent this incorrect demodulation, AFC (Automatic Frequency Control) is typically used. The AFC estimates a frequency offset in carrier frequency between the transmission side and reception side to control the frequencies of oscillators. The AFC also corrects demodulated signals for the rotated phase caused by the frequency offset.

Conventionally, a frequency offset estimator for use in the AFC relies on the differential detection as can be seen in FIG. 2 in Laid-open Japanese Patent Application No. 8-213933, "Characteristics of ½ Symbol Differential Detection AFC Having wide Frequency Pull-in Range," Technical Report, RCS96-25, 1st-6th Paragraphs, June 1996, "Frequency Offset Estimating Method in Fading Transmission Path with Large Time Dispersion," Technical Report, RCS98-81, 13th-18th paragraphs, September 1998, and the like. However, the differential detection type frequency offset estimator has a drawback that the accuracy of estimation is significantly degraded when the carrier to noise power ratio (CNR) is low.

For example, a CDMA (Code Division Multiple Access) communication system using the quasi-synchronous detection effectively utilizes a path diversity effect resulting from rake combination. In addition, required SNR (Signal to Noise Power Ratio) may occasionally be on the order of 0 dB at a bit error rate (BER) of 0.1%, resulting from the effects of error correcting codes, transmission power control and the like. It is therefore necessary to provide an expedient which is capable of estimating a frequency offset even at low CNR.

A conventional frequency offset estimator will be described with reference to FIG. 1. The differential detection frequency type offset estimator shown in FIG. 1 estimates a frequency offset from a difference in phase between symbols. First, complex multiplier 3 calculates a product of orthogonally detected complex demodulated symbol sequence 1 and a complex conjugate of a known symbol sequence 2 corresponding thereto. The product is fed to differential detector 15 as complex symbol sequence 13. Differential detector 15 delays complex symbol sequence 13 by several symbols using delay circuit 16, and complex multiplier 3 calculates a product of a complex conjugate of the delayed symbol sequence, which have passed through delay circuit 16, and original complex symbol sequence 13. This product is provided to averaging circuit 17 for averaging, and then delivered as frequency offset estimate 18. In this event, as larger noise is added to orthogonally detected complex demodulated symbol sequence 1, larger variations occur in the phase difference between symbols, resulting in a degraded accuracy of estimation for frequency offset. It is known that the accuracy of estimation is improved to some extent even using the differential detection, if the number of delayed symbols is increased. This is because the phase difference between symbols becomes larger relative to variations in phase due to noise. Disadvantageously, however, an increased number of delayed symbols results in a narrower range in which a frequency offset can be estimated. Therefore, when the differential detection type frequency offset estimator is used, a tradeoff is inevitably made between the accuracy of estimation and an estimatable range in regard to the number of delayed symbols.

On the other hand, there has been proposed an FFT (Fast Fourier Transform) based method as another frequency offset estimating method. This type of estimating method converts received symbols into a frequency domain by FFT, and determines a frequency indicative of a peak of a spectrum envelope as a frequency offset. This estimating method provides a higher accuracy of estimation at low CNR than the differential detection since the peak can be relatively easily found even if a received signal presents low CNR. However, the accuracy of estimation depends on the order of FFT. An article "FFT-Based Highly Accurate Frequency Determining Method," Transactions-A of the Institute of Electronics, Information and Communication Engineers, Vol. J 70-A, No. 5, pp.798–805 describes that FFT should be used at 32 points or more for estimating a frequency using FFT. However, the FFT cannot be used at 32 points or more in some occasions.

Conventionally, known symbols transmitted in a predetermined order have been used for estimating a frequency offset. In mobile communications, a section comprised of several symbols is called a "slot" which contains pilot symbols, data symbols, control symbols and the like. The pilot symbols refer to known symbols which are transmitted in a predetermined order. While the total number of symbols in a slot ranges from about fifteen to several hundreds, the number of pilot symbols is generally smaller than the number of data symbols.

Taking as an example, the international standard IMT-2000 for the next generation mobile communications, as described in an article "3G TS 25.211 version 3.2.0, 3rd Generation Partnership Project: Technical Specification Group Radio Access Network; Physical channels and mapping of transport channels onto physical channels (FDD)," one slot includes only 16 pilot symbols at most even at a high bit rate. In other words, when a frequency offset is estimated using sequential pilot symbols in one slot interval, a sufficient number of pilot symbols is not provided for utilizing the FFT. When pilot symbols are used over a plurality of slot intervals, a frequency offset can be estimated in a narrower range.

On the other hand, a peak detection type frequency offset estimating method has also been proposed, as can be seen in FIG. 1 in Laid-open Japanese Patent Application No. 9-200081. The proposed frequency offset estimating method, which is for use in a direct code spread communication system, involves despreading baseband complex signals orthogonally detected using complex spread codes previously applied with frequency offsets which have an equal absolute value and different signs, averaging several symbols acquired at timings at which a maximal peak is detected, and converting the power value of the average to a frequency offset using a previously measured conversion table. This estimating method is considered to provide a better accuracy of estimation at low CNR than the differential detection type since it uses an average value of symbols which are despread by spreading codes applied with frequency offsets. However, a conversion table must be previously created for calculating a frequency offset. When the conversion table is used, it can be thought that if the characteristics of devices vary from one apparatus to another, a resulting frequency offset may be different depending on a particular apparatus, so that the creation of a conversion table, in general, is not an easy task. In addition, a memory is required for storing the conversion table. Moreover, a correction may be required for suppressing variations in the characteristics of devices between apparatuses.

DISCLOSURE OF THE INVENTION

It is an object of the present invention to provide a frequency offset estimator which is less susceptible to a degraded accuracy of estimation even at low CNR in a CDMA communication system.

According to a first aspect of the present invention, the frequency offset estimator comprises complex multiplying means and frequency offset estimating means. The frequency offset estimating means includes a plurality of power sum calculating means and frequency offset control means.

The complex multiplying means receives an orthogonally detected complex demodulated symbol sequence, and calculates a product of the complex demodulated symbol sequence and a conjugate complex number of a known symbol sequence corresponding to the complex demodulated symbol sequence to remove a symbol information component.

Each of the power sum calculating means calculates a power sum for the complex demodulated symbol sequence based on an applied frequency offset after the symbol information component has been removed, and includes phase rotating means for changing the phase of the complex demodulated symbol sequence based on the frequency offset applied thereto after the symbol information component has been removed, N-symbol adding means for adding a plurality of complex symbols delivered from the phase rotating means, and M-power adding means for calculating the power of the complex symbol sum calculated by the N-symbol adding means, and adding the power of a plurality of symbols.

The frequency offset control means controls a frequency offset applied to the power sum calculating means based on the power sums calculated by the plurality of power sum calculating means, estimates a frequency offset included in the complex demodulated symbol sequence, and delivers the estimated frequency offset.

In this manner, the utilization of a gain resulting from the in-phase addition is utilized in a frequency offset estimation, and averaging of the in-phase added power values through the addition of power, results in the ability to estimate a frequency offset at CNR higher by several dB than CNR of received carrier power.

According to a second aspect of the present invention, a frequency offset estimator comprises a plurality of complex multiplying means, maximal-ratio combining means, a plurality of power sum calculating means, and frequency offset control means.

Each complex multiplying means receives an orthogonally detected complex demodulated symbol sequence, and calculates a product of the complex demodulated symbol sequence and a conjugate complex number of a known symbol sequence corresponding to the complex demodulated symbol sequence to remove a symbol information component included in each complex demodulated symbol sequence. The maximal-ratio combining means combines a plurality of complex demodulated symbol sequences, from which symbol information component has been removed, at a maximal-ratio to generate a single complex symbol sequence. The power sum calculating means and frequency offset control means are identical to the counterparts in the first aspect.

According to a third aspect of the present invention, a frequency offset estimator comprises a plurality of the frequency offset estimators in the first aspect, and a maximal-ratio combiner for combining frequency offset estimates of these frequency offset estimators at a maximal ratio.

BEST MODE FOR CARRYING OUT THE INVENTION

First Embodiment

Figure 1:
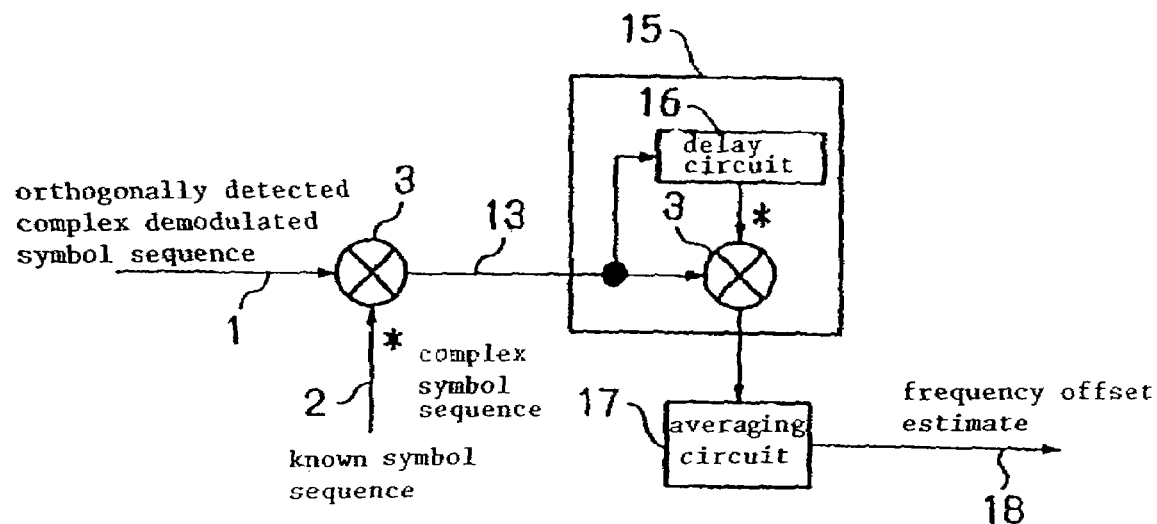
FIG. 1 is a block diagram illustrating a conventional frequency offset estimator based on the differential detection.
Figure 2:
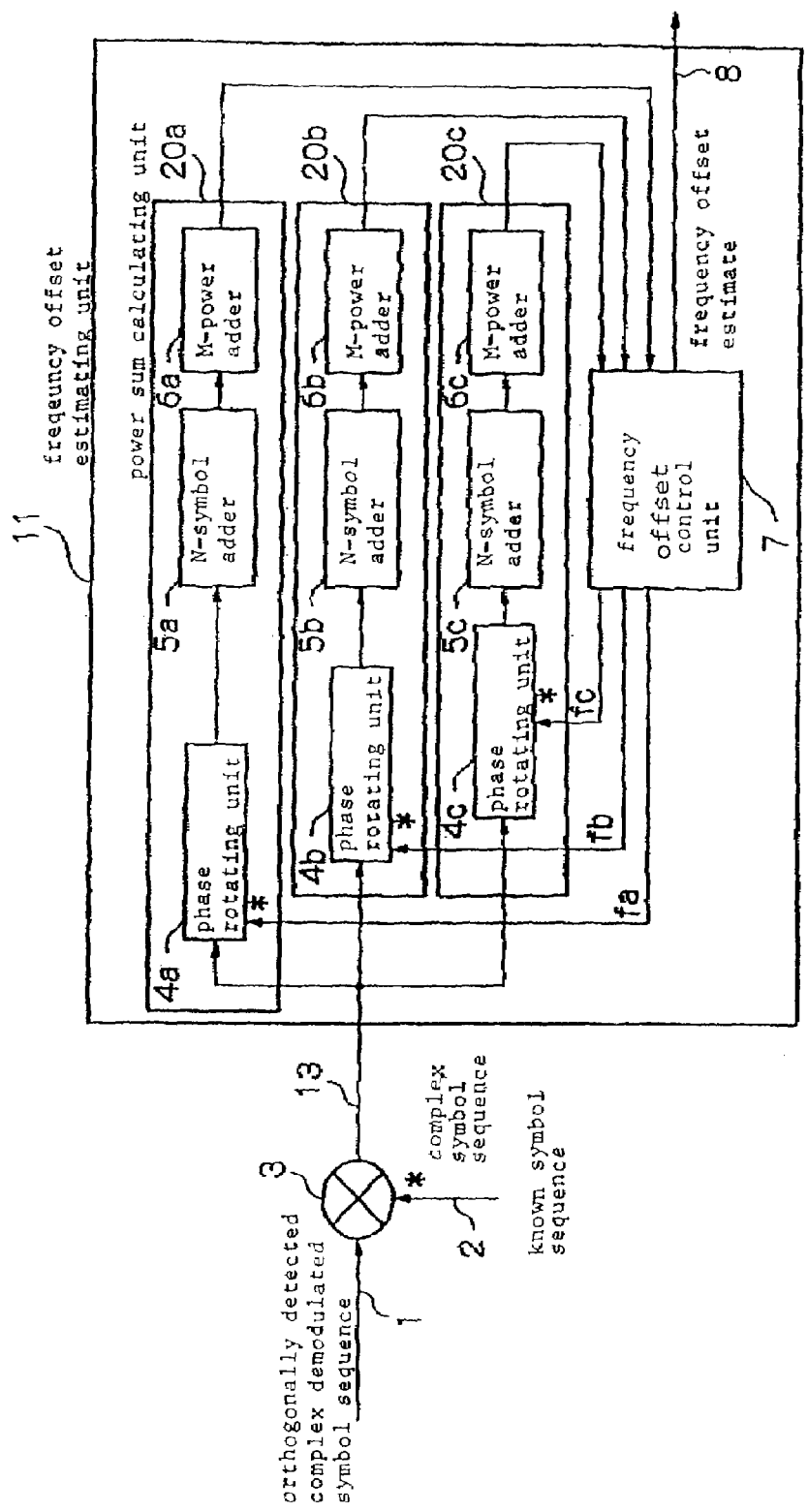
FIG. 2 is a block diagram illustrating a frequency offset estimator according to a first embodiment of the present invention.

Referring to FIG. 2, a frequency offset estimator according to a first embodiment of the present invention uses an orthogonally detected complex demodulated symbol sequence 1 and a known symbol sequence 2 corresponding thereto as input signals, and comprises complex multiplier 3 and frequency offset estimating unit 11. Frequency offset estimating unit 11 comprises power sum calculating units 20a, 20b, 20c, and frequency offset control unit 7. Power sum calculating unit 20a comprises phase rotating unit 4a, N-symbol adder 5a, and M-power adder 6a. Similarly, power sum calculating units 20b, 20c comprise phase rotating units 4b, 4c; N-symbol adders 5b, 5c; and M-power adders 6b, 6c, respectively.

First, complex multiplier 3 calculates a product of orthogonally detected complex demodulated symbol sequence 1 and a conjugate complex number of known symbol sequence 2. This processing can remove a symbol information component included in the demodulated symbol sequence to extract complex symbol sequence 13, the phase of which is rotated by a frequency offset. Used as known symbol sequence 2 may be pilot symbols which are generally used in a communication system based on the orthogonal modulation. Alternatively, in a direct code spread communication system, products of known spreading codes and pilot symbols can be used as known symbol sequence 2. Conventionally, a frequency offset has been estimated by the delayed detection using this complex symbol sequence 13.

In this embodiment, three different frequency offsets are applied to complex symbol sequence 13, a plurality of resulting symbols are added, and the power is added over the plurality of symbols. The frequency offsets applied to complex symbol sequence 13 are appropriately controlled based on three power sums thus calculated. This processing is repeated several times to estimate a frequency offset.

Complex symbol sequence 13 delivered from complex multiplier 3 is provided to phase rotating units 4a, 4b, 4c. Phase rotating units 4a, 4b, 4c change the phase of complex symbol sequence 13 based on frequency offsets fa, fb, fc, respectively, applied thereto from frequency offset control unit 7. Frequency offsets fa, fb, fc are applied as the amount of phase change per symbol. Phase rotating unit 4a rotates the phase of complex symbol sequence 13 by frequency offset fa in the negative direction. Similarly, phase rotating units 4b, 4c rotate the phase of complex symbol sequence 13 by frequency offset fb, fc, respectively, in the negative direction. Complex symbols delivered from phase rotating unit 4a are provided to N-symbol adder 5a; those from phase rotating unit 4b to N-symbol adder 5b; and those from phase rotating unit 4c to N-symbol adder 5c, respectively. N-symbol adders 5a, 5b, 5c each add N symbols of values provided from phase rotating units 4a, 4b, 4c, and N-symbol adder 5a supplies the resulting value after the addition to M-power adder 6a; N-symbol adder 5b to M-power adder 6b; and N-symbol adder 5c to M-power adder 6c, respectively, where N is an integer equal to or larger than two.

If any of frequency offsets fa, fb, fc supplied from frequency offset control unit 7 is close to a true frequency offset to be estimated, the sum of symbols applied with that frequency offset takes a larger value than the sums of symbols applied with other frequency offsets. Further, the additions made in N-symbol adders 5a, 5b, 5c relatively reduce the proportion of additive white Gauss noise which accounts for symbols after the additions.

M-power adders 6a, 6b, 6c respectively calculate the power of values supplied from N-symbol adders 5a, 5b, 5c, and repeat the addition of the power M times where M is an integer equal to or larger than two. In this manner, the power values of the sums delivered from N-symbol adders 5a, 5b, 5c are averaged. The three power sums thus calculated are provided to frequency offset control unit 7. N-symbol adders 5a, 5b, 5c add N symbols, and M-power adders 6a, 6b, 6c add the power M times, so that M-power adders 6a, 6b, 6c each supply one power sum to frequency offset control unit 7 using N×M complex demodulated symbols which are orthogonally detected.

Frequency offset control unit 7 controls frequency offsets applied to phase rotating units 4a, 4b, 4c based on the three power sums supplied from M-power adders 6a, 6b, 6c. The three power values calculated by adding complex symbols, while applying the frequency offsets thereto, and adding the power, are larger as the frequency offset applied thereto are closer to a true frequency offset to be estimated. Thus, based on the magnitude relationship, frequency offset control unit 7 can control frequency offsets fa, fb, fc applied to phase rotating units 4a, 4b, 4c.

As frequency offset control unit 7 updates frequency offsets fa, fb, fc applied to phase rotating units 4a, 4b, 4c, the power sums are calculated again by phase rotating units 4a, 4b, 4c, N-symbol adders 5a, 5b, 5c, and M-power adders 6a, 6b, 6c using the updated frequency offsets. Frequency offset control unit 7 appropriately controls frequency offsets fa, fb, fc again using the calculated power sums. After repeating the calculation of power sums and the update of frequency offsets several times, frequency offset control unit 7 selects one from frequency offsets fa, fb, fc for delivery as frequency offset estimate 8.

Figure 3A:
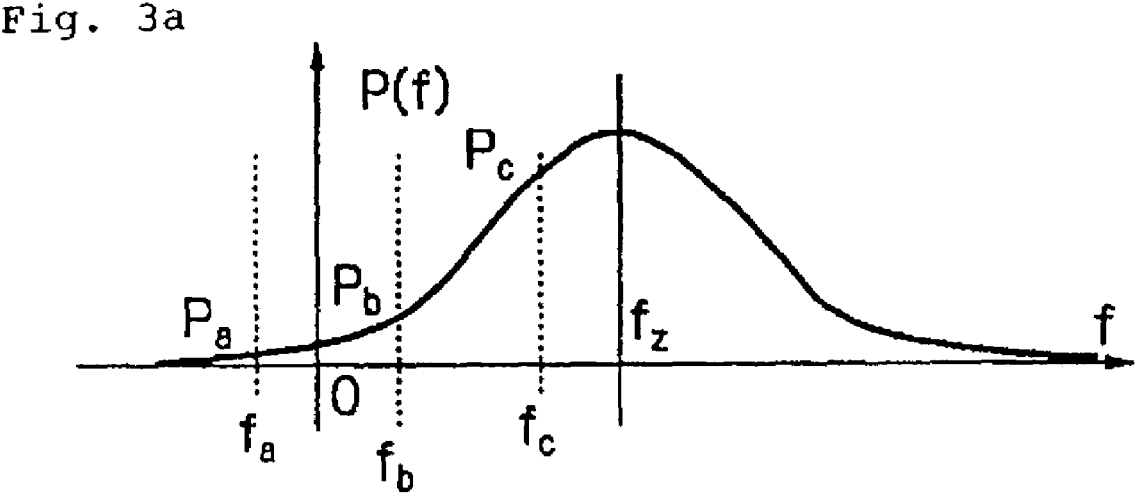
FIG. 3 is a diagram showing the relationship between the power spectrum of a signal including a frequency offset fz and frequency offsets fa, fb, fc controlled by frequency offset control unit 7.
Figure 3B:
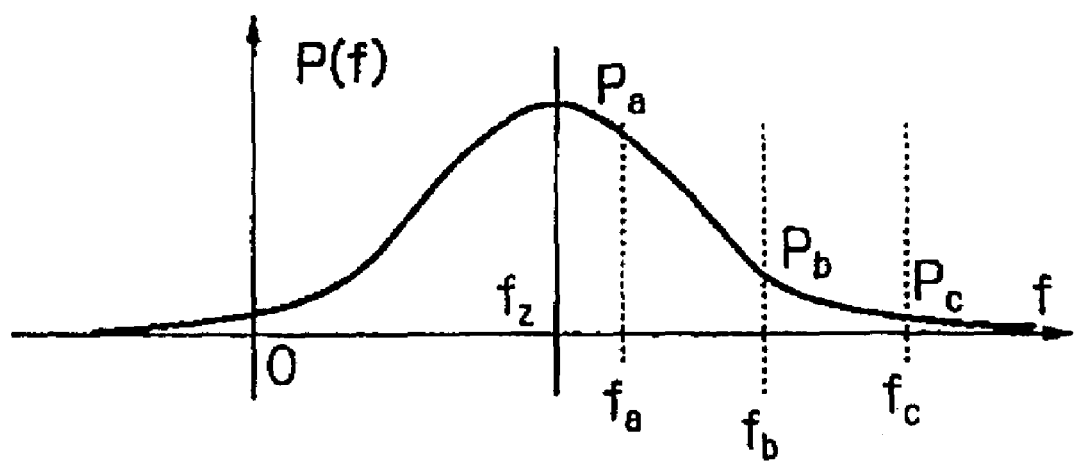

Next, the magnitude relationship among the three power sums calculated by M-power adders 6a, 6b, 6c will be described with reference to FIGS. 3a, 3b. FIGS. 3a, 3b show a power spectrum distribution of complex symbol sequence 13 in FIG. 2, where the horizontal axis represents the frequency, and the vertical axis represents the magnitude of power spectrum. Since complex symbol sequence 13 in FIG. 2 is the product of orthogonally detected complex demodulated symbol sequence 1 and a complex conjugate of known symbol sequence 2, a peak should exist in a direct current component if no frequency offset is present. When positive frequency offset fz is included, the power spectrum of complex symbol sequence 13 presents a simple convex waveform with the center frequency being shifted by fz in the positive direction, as shown in FIGS. 3a, 3b. In other words, the power spectrum is largest at frequency offset fz, and is reduced as it is further away from fz.

Assume now that in the frequency offset estimator of FIG. 2, frequency offsets applied to phase rotating units 4a, 4b, 4c are designated fa, fb, fc, respectively, and are placed in a magnitude relationship represented by fa<fb<fc. Further, when the power spectra at respective frequency offsets fa, fb, fc are designated Pa, Pb, Pc, respectively, the magnitude relationship among Pa, Pb, Pc varies depending on the magnitude relationship among fa, fb, fc and fz. As shown in FIG. 3a, when fa<fb<fc<fz, the magnitude relationship among the power spectra is represented by Pa<Pb<Pc. Conversely, when fz<fa<fb<fc, Pa>Pb>Pc is established as shown in FIG. 3b. Frequency offset control unit 7 relies on the foregoing relationships to control the frequency offsets applied to phase rotating units 4a, 4b, 4c.

Figure 4:
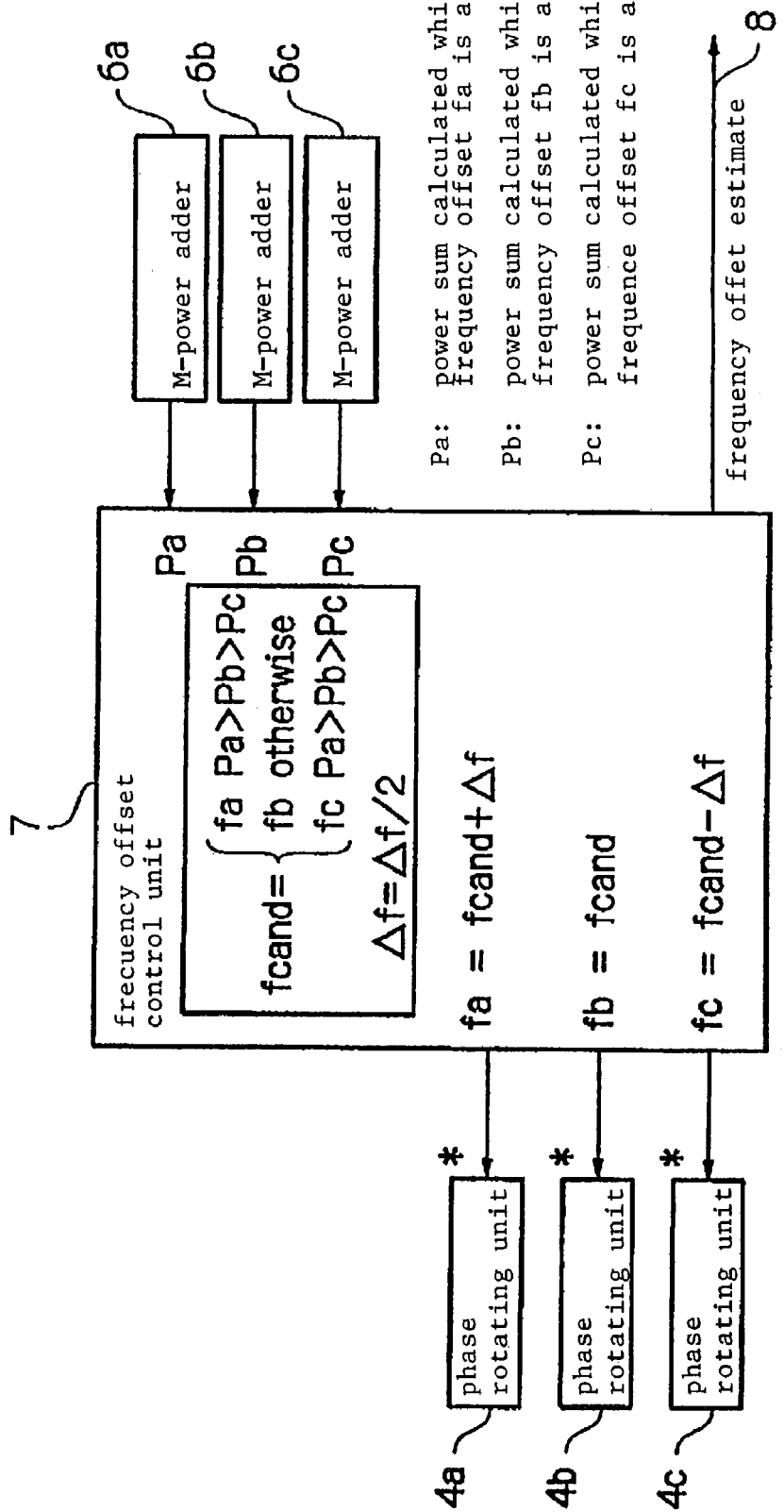
FIG. 4 is a block diagram illustrating a specific example of frequency offset control unit 7.

Next, a specific example of frequency offset control unit 7 will be supplied with reference to FIG. 4. Frequency offset control unit 7 is applied with power values Pa, Pb, Pc from M-power adders 6a, 6b, 6c, respectively. Pa is a power sum calculated by N-symbol adder 5a and M-power adder 6a while frequency offset fa is applied to phase rotating unit 4a. Pb is a power sum calculated by N-symbol adder 5b and M-power adder 6b while frequency offset fb is applied to phase rotating unit 4b. Pc is a power sum calculated by N-symbol adder 5c and M-power adder 6c while frequency offset fc is applied to phase rotating unit 4c. Frequency offset control unit 7 updates frequency offsets fa, fb, fc applied to phase rotating units 4a, 4b, 4c using these three power sums Pa, Pb, Pc. Frequency offset control unit 7 utilizes the aforementioned relationships among fz, fa, fb, fc and power spectra, and compares power sums Pa, Pb, Pc with one another to determine fcand. An exemplary process for determining fcand is shown below.

(1) When power sums Pa, Pc, Pc are in a magnitude relationship represented by Pa>Pb>Pc, fcand=fa.

(2) When power sums Pa, Pc, Pc are in a magnitude relationship represented by Pc>Pb>Pa, fcand=fc.

(3) When power sums Pa, Pb, Pc are in a magnitude relationship which does not fall under either (1) or (2), fcand=fb.

Furthermore, a value $\Delta f$ is used. One-half of current $\Delta f$ value is used as the next $\Delta f$:

$$\Delta f = \Delta f/2$$

Frequency offset control unit 7 updates frequency offsets fa, fb, fc in the following manner using fcand and Δf thus determined:

$$fa = fcand + \Delta f$$

$$fb = fcand$$

$$fc = fcand - \Delta f$$

In accordance with the foregoing method of determining fa, fb, fc, any of the values fa, fb, fc before updating are substituted into fb. Therefore, a power sum corresponding to fcand of power sums Pa, Pb, Pc calculated before the update can be used as Pb as it is when fa, fb, fc are updated the next time. In other words, when frequency offset control unit 7 first updates fa, fb, fc, phase rotating units 4a, 4b, 4c, N-symbol adders 5a, 5b, 5c, and M-power adders 6a, 6b, 6c are fully operated to calculate power sums Pa, Pb, Pc. However, once fa, fb, fc are updated, it is not necessary to operate phase rotating unit 4b, N-symbol adder 5b, and M-power adder 6b. In the foregoing manner, frequency offset control unit 7 delivers fcand as frequency offset estimate 8 after it has updated frequency offsets fa, fb, fc several times. Of course, frequency offset control unit 7 may employ a method of determining fa, fb, fc other than that described above.

Second Embodiment

Figure 5:
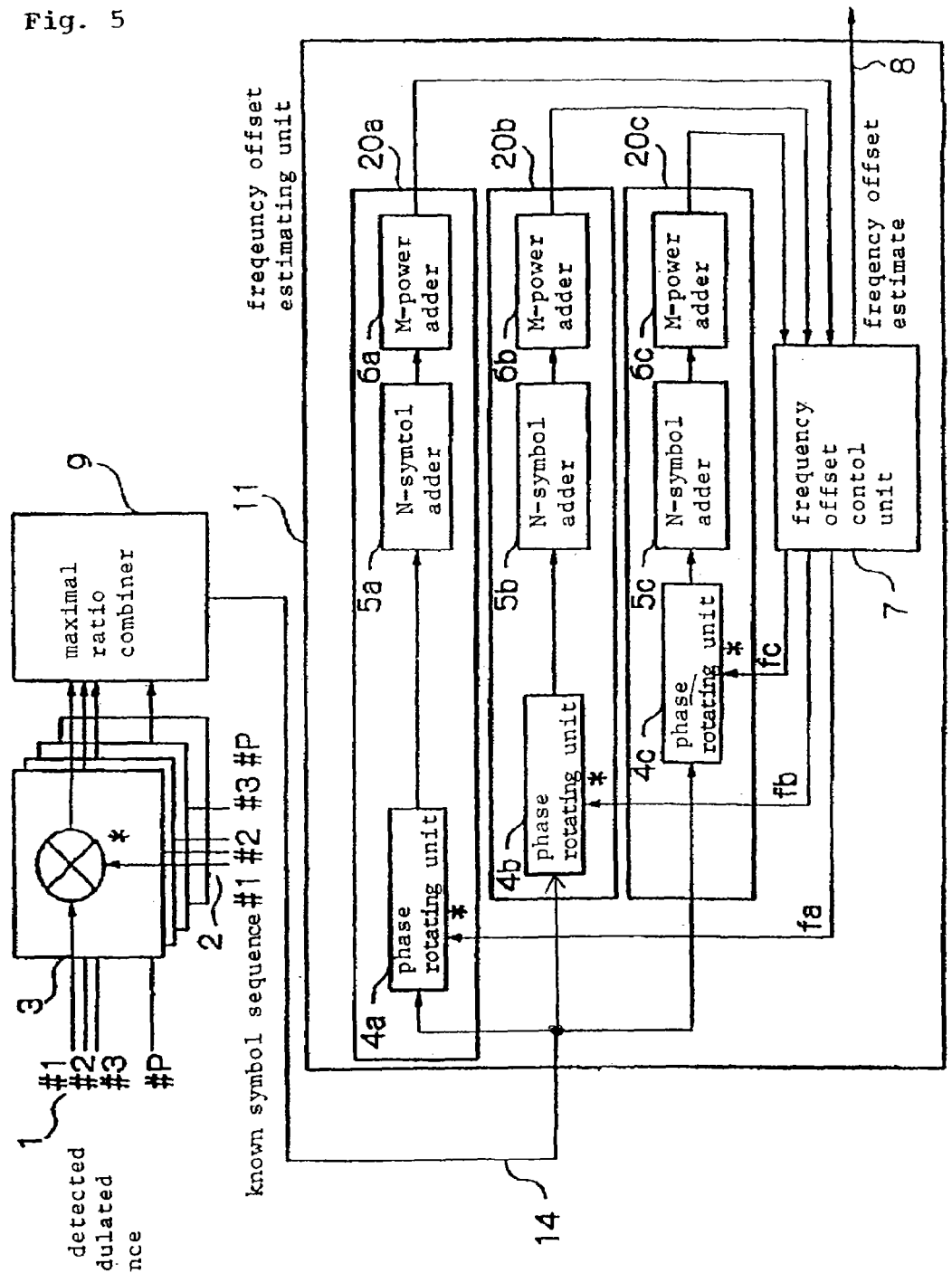
FIG. 5 is a block diagram illustrating a frequency offset estimator according to a second embodiment of the present invention.

Next, a second embodiment of the present invention will be described with reference to FIG. 5. A frequency offset estimator according to the second embodiment uses P orthogonally detected complex demodulated symbol sequences 1 (#1–#P), and known symbol sequences 2 (#1–#P) corresponding thereto as input signals, and estimates a frequency offset using complex multiplier 3, maximal-ratio combiner 9, and frequency offset estimating unit 11. Frequency offset estimating unit 11 has completely the same functions as frequency offset estimating unit 11 in FIG. 2.

P complex demodulated symbol sequences 1 may be, for example, signals from different antennas, or multipath signals, for example, in a direct spread communication system. The frequency offset estimator can expect a certain gain and also provide redundancy by the use of a plurality of complex demodulated symbol sequences 1.

Complex multiplier 3 calculates products of orthogonally detected complex demodulated symbol sequences #1–190 P and conjugate complex numbers of known symbol sequences #1–190 P corresponding thereto, and supplies the products to maximal-ratio combiner 9. Maximal-ratio combiner 9 first estimates CNRs of complex symbol sequences #1–190 P supplied from complex multiplier 3. Next, Maximal-ratio combiner 9 determines a weighting coefficient for each symbol sequence from CNR of each symbol sequence so as to provide maximal CNR after combination. Then, after weighting respective symbol sequences #1–190 P using the determined weighting coefficients, the resulting symbol sequences are combined in phase, and delivered as complex symbol sequence 14. Complex symbol sequence 14, generated by combining complex symbol sequences #1–190 P at the maximal CNR, is provided to frequency offset estimating unit 11. The frequency offset estimating unit 11 operates completely in the same manner as that shown in FIG. 2.

Third Embodiment

Figure 6:
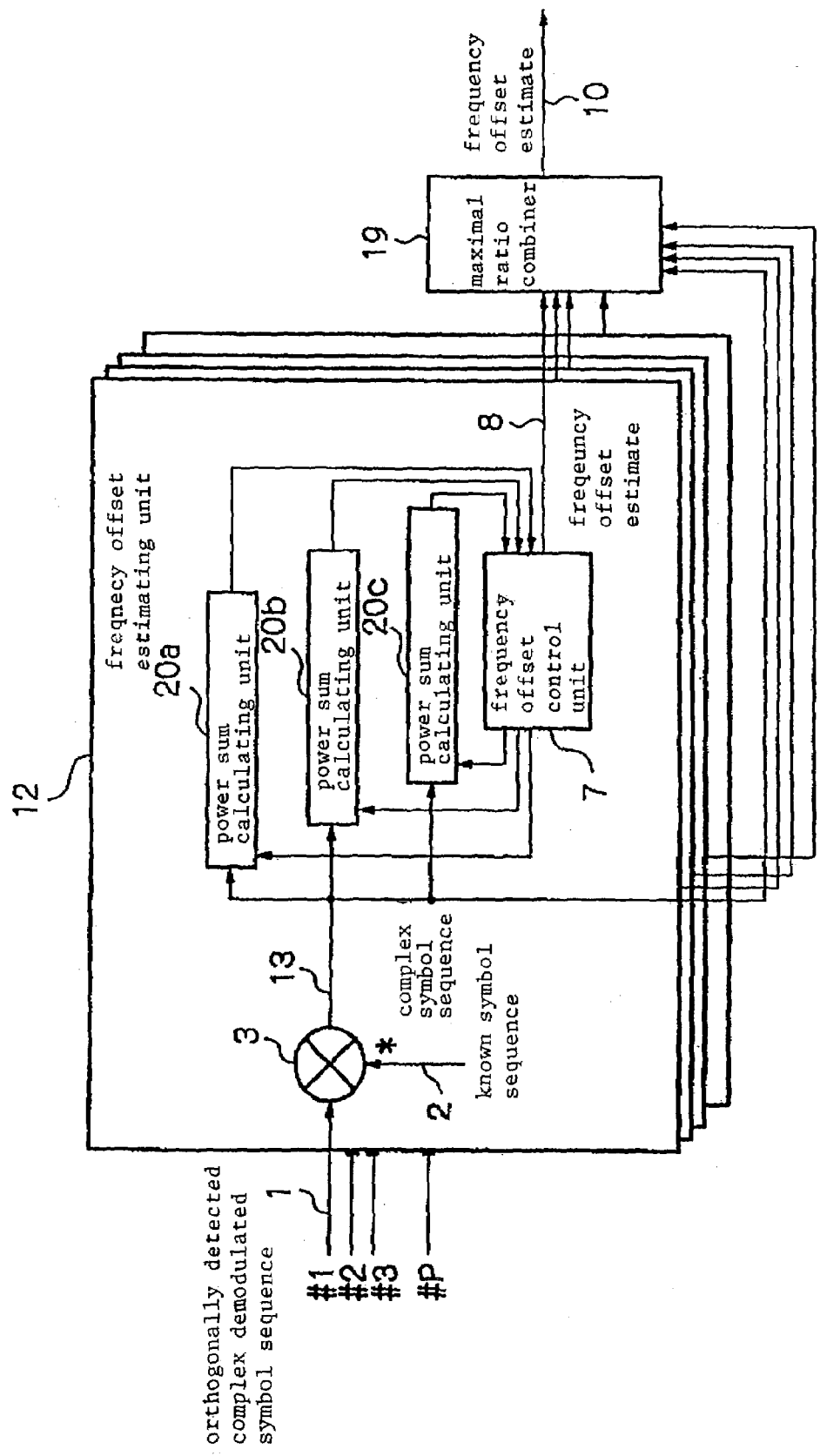
FIG. 6 is a block diagram illustrating a frequency offset estimator according to a third embodiment of the present invention.

Next, a third embodiment of the present invention will be described with reference to FIG. 6. A frequency offset estimator according to the third embodiment uses P orthogonally detected complex demodulated symbol sequences 1 (#1–190 P), and known symbol sequences 2 (#1–190 P) corresponding thereto, and comprises P frequency offset estimating units 12 in the first embodiment, each for independently estimating a frequency offset for each complex demodulated symbol sequence 1; and maximal-ratio combiner 19 for combining P frequency offset estimates estimated by these frequency offset estimating units 12 at a maximal ratio.

First, orthogonally detected complex demodulated symbol sequences #1–190 P are supplied to P frequency offset estimating units 12. Frequency offset estimating units 12 are identical to the frequency offset estimating unit in the first embodiment. Frequency offset estimating units 12 each estimate frequency offset estimate 8 using corresponding complex symbol sequences #1–190 P. Maximal-ratio combiner 19 first estimates CNR of complex symbol sequence 13 after information symbol components are removed from complex symbol sequences #1–190 P. Next, maximal-ratio combiner 19 determines a weighting coefficient for each symbol sequence from the CNR of each symbol sequence to provide maximal CNR when it combines complex symbol sequences 13 for complex symbol sequences #1–190 P. Then, maximal-ratio combiner 19 adds, with weighting, P frequency offset estimates 8 corresponding to complex demodulated symbol sequences #1–190 P using the determined weighting coefficients, and delivers the resulting sum as frequency offset estimate 10.

The invention claimed is:

1. A frequency offset estimator comprising:

complex multiplying means for receiving an orthogonally detected complex demodulated symbol sequence, and calculating a product of said complex demodulated symbol sequence and a conjugate complex number of a known symbol sequence corresponding to said complex demodulated symbol sequence to remove a symbol information component;

a plurality of power sum calculating means each for calculating a power sum for said complex demodulated symbol sequence based on an applied frequency offset after the symbol information component has been removed; and frequency offset control means for controlling a frequency offset applied to said each power sum calculating means based on power sums calculated by said plurality of power sum calculating means, estimating a frequency offset included in said complex demodulated symbol sequence, and delivering the estimated frequency offset, wherein said each power sum calculating means include phase rotating means for changing the phase of the complex demodulated symbol sequence based on the frequency offset applied thereto after the symbol information component has been removed, N-symbol adding means for adding a plurality of complex symbols delivered from said phase rotating means, and M-power adding means for calculating the power of the complex symbol sum calculated by said N-symbol adding mean while adding the power of a plurality of symbols.

2. A frequency offset estimator comprising:

a plurality of complex multiplying means each for receiving one of a plurality of orthogonally detected complex demodulated symbol sequences, and calculating a product of each said complex demodulated symbol sequence and a conjugate complex number of a known symbol sequence corresponding to each said complex demodulated symbol sequence to remove a symbol information component included in said complex modulated symbol sequence;

maximal-ratio combining means for combining said plurality of complex demodulated symbol sequences, from which the symbol information components are removed, at a maximal ratio to generate a single complex symbol sequence;

a plurality of power sum calculating means for calculating a power sum for said complex symbol sequence after the maximal-ratio combination based on applied frequency offsets; and frequency offset control means for controlling a frequency offset applied to said each power sum calculating means based on power sums calculated by said plurality of power sum calculating means, estimating a frequency offset included in said complex demodulated symbol sequence, and delivering the estimated frequency offset, wherein said each power sum calculating mean include phase rotating means for changing the phase of said complex symbol sequence after the maximal-ratio combination based on the applied frequency offset, N-symbol adding means for adding a plurality of complex symbols delivered by said phase rotating means, and M-power adding means for calculating the power of a complex symbol sum calculated by said N-symbol adding means, and adding the power of a plurality of symbols.

3. A frequency offset estimator comprising:

a plurality of frequency offset estimating units each including complex multiplying means for receiving an orthogonally detected complex demodulated symbol sequence, and calculating a product of said complex demodulated symbol sequence and a conjugate complex number of a known symbol sequence corresponding to said complex demodulated symbol sequence to remove a symbol information component; a plurality of power sum calculating means each for calculating a power sum for said complex demodulated symbol sequence based on an applied frequency offset after the symbol information component has been removed; and frequency offset control means for controlling a frequency offset applied to said each power sum calculating means based on power sums calculated by said plurality of power sum calculating means, estimating a frequency offset included in said complex demodulated symbol sequence, and delivering the estimated frequency offset, wherein said each power sum calculating means include phase rotating means for changing the phase of the complex demodulated symbol sequence based on the frequency offset applied thereto after the symbol information component has been removed, N-symbol adding means for adding a plurality of complex symbols delivered from said phase rotating means, and M-power adding means for calculating the power of the complex symbol sum calculated by said N-symbol adding means, and adding the power of a plurality of symbols; and a maximal-ratio combiner for combining frequency offset estimates provided by said plurality of frequency offset estimating units at a maximal ratio to generate a single frequency offset estimate.

4. A frequency offset estimator comprising:

symbol information removing means for receiving an orthogonally detected complex demodulated symbol sequence, and removing a symbol information component;

a plurality of power sum calculating means each for calculating a power sum for said complex demodulated symbol sequence based on an applied frequency offset after the symbol information component has been removed; and frequency offset control means for controlling a frequency offset applied to said each power sum calculating means based on power sums calculated by said plurality of power sum calculating means, estimating a frequency offset included in said complex demodulated symbol sequence, and delivering the estimated frequency offset, wherein said each power sum calculating means include:

phase rotating means for changing the phase of the complex demodulated symbol sequence based on the frequency offset applied thereto after the symbol information component has been removed, N-symbol adding means for adding one or more complex symbols delivered from said phase rotating means, and M-power adding means for calculating the power of the complex symbol sum calculated by said N-symbol adding mean while adding the power of one or more symbols.

5. A frequency offset estimator comprising:

a plurality of symbol information removing means each for receiving one of a plurality of orthogonally detected complex demodulated symbol sequences, and removing a symbol information component included in said complex modulated symbol sequence;

maximal-ratio combining means for combining said plurality of complex demodulated symbol sequences, from which the symbol information components are removed, at a maximal ratio to generate a single complex symbol sequence;

a plurality of power sum calculating means for calculating a power sum for said complex symbol sequence after the maximal-ratio combination based on applied frequency offsets; and frequency offset control means for controlling a frequency offset applied to said each power sum calculating means based on power sums calculated by said plurality of power sum calculating means, estimating a frequency offset included in said complex demodulated symbol sequence, and delivering the estimated frequency offset, wherein said each power sum calculating mean include:

phase rotating means for changing the phase of said complex symbol sequence after the maximal-ratio combination based on the applied frequency offset, N-symbol adding means for adding one or more complex symbols delivered by said phase rotating means, and M-power adding means for calculating the power of a complex symbol sum calculated by said N-symbol adding means, and adding the power of one or more symbols.

6. A frequency offset estimator comprising:

a plurality of frequency offset estimating units each including:

symbol information removing means for receiving an orthogonally detected complex demodulated symbol sequence, and removing a symbol information component, a plurality of power sum calculating means each for calculating a power sum for said complex demodulated symbol sequence based on an applied frequency offset after the symbol information component has been removed, and frequency offset control means for controlling a frequency offset applied to said each power sum calculating means based on power sums calculated by said plurality of power sum calculating means, estimating a frequency offset included in said complex demodulated symbol sequence, and delivering the estimated frequency offset, wherein each of said plurality of power sum calculating means include:

phase rotating means for changing the phase of the complex demodulated symbol sequence based on the frequency offset applied thereto after the symbol information component has been removed, N-symbol adding means for adding one or more complex symbols delivered from said phase rotating means, and M-power adding means for calculating the power of the complex symbol sum calculated by said N-symbol adding means, and adding the power of said one or more a symbols; and a maximal-ratio combiner for combining frequency offset estimates provided by said plurality of frequency offset estimating units at a maximal ratio to generate a single frequency offset estimate.

7. A frequency offset estimating method comprising:

a) receiving an orthogonally detected complex demodulated symbol sequence, and removing a symbol information component;

b) calculating a power sum for said complex demodulated symbol sequence based on an applied frequency offset after the symbol information component has been removed; and c) controlling a frequency offset applied to said step b) based on power sums calculated at said step b), estimating a frequency offset included in said complex demodulated symbol sequence, and delivering the estimated frequency offset, wherein said step b) further includes a phase rotating step for changing the phase of the complex demodulated symbol sequence based on the frequency offset applied thereto after the symbol information component has been removed, an N-symbol adding step for adding one or more complex symbols delivered from said phase rotating step, and an M-power adding step for calculating the power of the complex symbol sum calculated at said N-symbol adding step while adding the power of one or more symbols.

8. A frequency offset estimating method comprising:

a) receiving one of a plurality of orthogonally detected complex demodulated symbol sequences, and removing a symbol information component included in said complex modulated symbol sequence;

b) combining said plurality of complex demodulated symbol sequences, from which the symbol information components are removed, at a maximal ratio to generate a single complex symbol sequence;

c) calculating a power sum for said complex symbol sequence after the maximal-ratio combination based on applied frequency offsets; and d) controlling a frequency offset applied to said step b) based on power sums calculated at said step b), estimating a frequency offset included in said complex demodulated symbol sequence, and delivering the estimated frequency offset, wherein said step c) further includes:

a phase rotating step for changing the phase of said complex symbol sequence after the maximal-ratio combination based on the applied frequency offset, an N-symbol adding step for adding one or more complex symbols delivered at said phase rotating step, and an M-power adding step for calculating the power of a complex symbol sum calculated at said N-symbol adding step, and adding the power of said one or more symbols.

* * * * *